(12) United States Patent
Simske et al.

(10) Patent No.: US 11,688,153 B2
(45) Date of Patent: *Jun. 27, 2023

(54) OBJECT ID-CENTERED WORKFLOW

(71) Applicant: HEWLETT-PACKARD DEVELOPMENT COMPANY, L.P., Spring, TX (US)

(72) Inventors: Steven J. Simske, Ft. Collins, CO (US); Guy Adams, Bristol (GB); Stephen Pollard, Bristol (GB); Jason S. Aronoff, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,902

(22) Filed: May 3, 2021

(65) Prior Publication Data

US 2021/0256235 A1 Aug. 19, 2021

Related U.S. Application Data

(63) Continuation of application No. 16/769,723, filed as application No. PCT/US2018/015722 on Jan. 29, 2018, now Pat. No. 11,074,423.

(51) Int. Cl.
*G06V 10/24* (2022.01)
*G06K 7/10* (2006.01)
*G06K 7/14* (2006.01)

(52) U.S. Cl.
CPC ....... *G06V 10/245* (2022.01); *G06K 7/10722* (2013.01); *G06K 7/1417* (2013.01)

(58) Field of Classification Search
CPC ............ G06K 7/1417; G06K 7/10722; G06V 10/245; G06Q 10/06
See application file for complete search history.

(56) References Cited

U.S. PATENT DOCUMENTS

| 8,533,075 | B1 | 9/2013 | Sayers, III et al. |
| 8,756,124 | B1* | 6/2014 | Sayers, III ......... G06Q 30/0185 |
| | | | 705/28 |
| 9,355,344 | B2 | 5/2016 | Slavin |
| 9,619,706 | B2 | 4/2017 | Scott |
| 9,656,428 | B2 | 5/2017 | Voris |
| 11,074,423 | B2* | 7/2021 | Simske ................. G06Q 10/06 |
| 2005/0050052 | A1 | 3/2005 | Zimmerman |
| 2007/0174461 | A1 | 7/2007 | Reilly |
| 2009/0006997 | A1 | 1/2009 | Jiang et al. |
| 2011/0119291 | A1 | 5/2011 | Rice |
| 2012/0051601 | A1 | 3/2012 | Simske et al. |
| 2012/0078736 | A1 | 3/2012 | Denzer |
| 2014/0006282 | A1 | 1/2014 | Friedman |

(Continued)

FOREIGN PATENT DOCUMENTS

| CN | 101052005 A | 10/2007 |
| CN | 101334865 A | 12/2008 |
| CN | 102439607 A | 5/2012 |

(Continued)

*Primary Examiner* — Matthew Mikels
(74) *Attorney, Agent, or Firm* — Michael Dryja

(57) ABSTRACT

An object ID-centered workflow method utilizes an object identifier (ID) associated with an object. Forensic identification of serialization elements of the object ID enables access to a registry of workflows.

19 Claims, 8 Drawing Sheets

(56) References Cited

U.S. PATENT DOCUMENTS

2017/0206532 A1     7/2017  Choi

FOREIGN PATENT DOCUMENTS

| CN | 104915909 A   | 9/2015  |
| JP | 11-316780 A   | 11/1999 |
| WO | 2016168935 A1 | 10/2016 |
| WO | 2017037334 A1 | 3/2017  |
| WO | 2017223242 A1 | 12/2017 |

* cited by examiner

OBJECT ID-CENTERED WORKFLOW

RELATED APPLICATIONS

This application is a continuation of Non-Provisional application Ser. No. 16/769,723 titled "Object ID-Centered Workflow" and filed on Jun. 4, 2020, which is a 371 of PCT/US2018/015722 titled "Object ID-Centered Workflow" and filed on Jan. 29, 2018, both of which are hereby incorporated by reference in their entireties.

BACKGROUND

Variable data components (VDCs), of which variable data printed objects (VDPs) is one type, are machine-readable components that contain embedded information. The embedded information, upon extraction, can perform any number of functions or trigger any number of workflows. For example, a scanning device of a mobile device can capture a printed VDC. The embedded information can then be extracted, the information from which could direct a web browser of the mobile device to a particular website. Such variable data components can also be used in the detection of counterfeit products. The VDCs can also be used to drive the steps of other multi-step interactions.

DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1A or 1B, numbers in the 200 series refer to features originally found in FIG. 2A or 2B, and so on.

DETAILED DESCRIPTION

Figure 1:
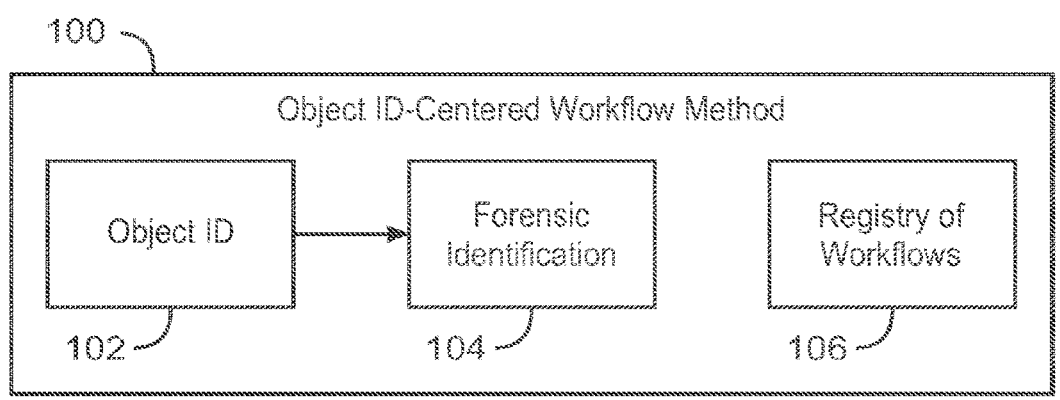
FIG. 1 is a simplified diagram of an object ID-centered workflow method, according to some examples.

Variable data components (VDCs) can be used to encode information. The encoded information, once extracted, can be used to perform any number of functions. For example, encoded information in a VDC can be used to trigger subsequent workflows. As a specific example, a user may scan a Quick Response Code (QR code) located at a bus stop with an image scanning tool (e.g. camera) of a mobile device. Information encoded in the QR code could direct the web browser of the mobile device to a web page that displays bus route information for busses passing that stop.

VDCs can also be used to assist in the detection of counterfeit products. For example, a printed VDC could be placed on a product package. A scanner of a mobile device can capture the VDC. The data is then parsed, either by the mobile device or a distributed service on a remote computing device, to retrieve the embedded information. In some examples, the embedded information includes an electronic security image that is returned to the mobile device. If the electronic security image matches a security image printed on the product package, a user may have some measure of confidence that the product is authentic. By comparison, if the printed security image does not match the transmitted security image, a user can acknowledge that the associated product may be counterfeit. While specific workflows are described herein, particularly as they relate to product authentication, the variable data components as described herein may be used to trigger any number of downstream workflows.

While such VDCs are useful in executing subsequent workflows and to some degree detecting counterfeit products, some characteristics of the environment in which the VDCs are used, reduce their more wide-spread implementation. For example, any workflow triggered by the scanning of a VDC is generic, and not user-specific. Returning to the above example, any user who scans a QR code at a bus stop will receive the same information, regardless of the identity of the user. Accordingly, fully customizable role-based workflows that are generated and executed based on user-specific information are not possible.

Still further, VDCs as used to authenticate products can be data-mined. For example, a data-mining bot, i.e., a computing application that runs automated scripts, can attempt to replicate a security image. In this example, an insidious third party can then print the replicated security image and fraudulently place that security image on a counterfeit product. More specifically, the bot could scan a barcode or permute numerical combinations represented by a barcode, and then poll the networked computing device for all variations of an associated security mark, which security mark could be a guilloche or other graphical alphanumeric (that is, set of symbols representing specific codes or strings). A counterfeiter could then place the guilloche on their own product, thus confusing a consumer as to the authenticity of a particular product.

A mobile device may be uniquely identified by a serial number, an International Mobile Equipment Identity (IMEI), or a media access control (MAC) address, as examples, and are known herein as object identifiers or IDs. Since these and other serializations, or even simple variable-data printed (VDP) objects contain multiple elements (e.g. individual digits, alphabetic, alphanumeric, or general glyph characters), each element of the object ID may be separately considered. The object ID may be mass serialized, be generic to a class of objects, or both. Mass serialized object IDs would be unique to each object, while generic object IDs may be repeated across many units, in other words, the same for every object in a lot or class of objects. IoT devices, such as sensors disposed along an oil pipeline, of which there may be thousands or more, may be suitable for generic object IDs, as one example. Whether mass serialized or generic, the object ID is used to trigger a customized downstream workflow, as described herein.

There is a call for a forensic registry for the next-generation Internet, including the Internet of Things. An object ID having multiple elements may be useful in this respect. For example, each element of the object ID may be connected to a specific registry, web service, database, or certification authority. This parsing of the object ID affords multiple layers of object verification, anticipating and obviating security threats, attacks and compromises. Further, each element of the object ID affords variable role-based access control in the object centered workflows.

Accordingly, a means is provided herein to use a serialization (IMEI, MAC, mass serialization code, element in a VDP-based series, etc.) to connect to various on-line and/or off-line registries for a set of (role-based) registry workflows. Optionally, a standards-compliant mark (such as a barcode) may be used to connect to the service which manages other salient registry connections.

FIG. 1 is a simplified diagram of an object ID-centered workflow method 100, according to examples. The object ID-centered workflow 100 is the enablement of a panoply of workflows when a custom-manufactured (for example, a custom-two-dimensional (2D) or -3D-printed) object is forensically identified, in element or in multiple elements. The customized object may include a printed serialization, even as simple as the IMEI (International Mobile Equipment Identity) or MAC (media access control) address, known herein as an object ID. Since these and other serializations (or even simple variable-data printed, or VDP, objects) contain multiple elements, such as individual digits, alphabetic, alphanumeric or general glyph characters, each element can be connected to a specific registry, web service, database, or certification authority. Thus, the object ID-centered workflow method 100 may afford multiple layers of object verification, anticipating and obviating security threats, attacks and compromises. The object ID-centered workflow method 100 also provides variable role-based access control in the object centered workflows.

While the object ID is associated with an object, the workflows may be available and associated with a user device, such as a mobile phone, as illustrated below. Or, workflows may be moderated/mediated through a user interface on the device. Thus, reading the object ID of the object leads the user of the device to an application or service or workflow interface that may be used to trigger what happens based on the role of the user, which itself may be moderated by their device, identity, other authentication mechanism, and so on. In examples, the object ID-centered workflow method 100 provides a variety of parallel (or even overlapping) registry access workflows, one or more of which may be associated with a single role.

The object ID-centered workflow method 100 utilizes an object identifier (ID) 102 or VDC, in which forensic identification 104 of the object ID enables access to a registry of workflows 106, as described below. To implement the object ID-centered workflow method 100 utilizing the object ID 102, elements of the object ID 102 are forensically registered at the time of manufacture or assembly (both of which are referred to herein as "manufacture") of the object upon which the object ID is disposed. Further, the object ID 102 of the object is readable, or forensically identified 104, by some device in the field. Once the forensic identification 104 succeeds, access to one or more registries of workflows is made available to the computing device, and thus a user of the computing device.

The forensic identification is an authentication of the object upon which the object ID is imprinted. A separate authentication of the user, the user device, the user location, and/or the user knowledge, may also be performed as needed. User authentication may include biometric or username/password verification as examples. User knowledge may include a personal identification number (PIN) or a security question, as examples. The user device may be a computing device, such as a mobile phone, pad, notebook, laptop computer, and so on, or an IoT object not associated with a user, such as a scanner or actuator.

Figure 2:
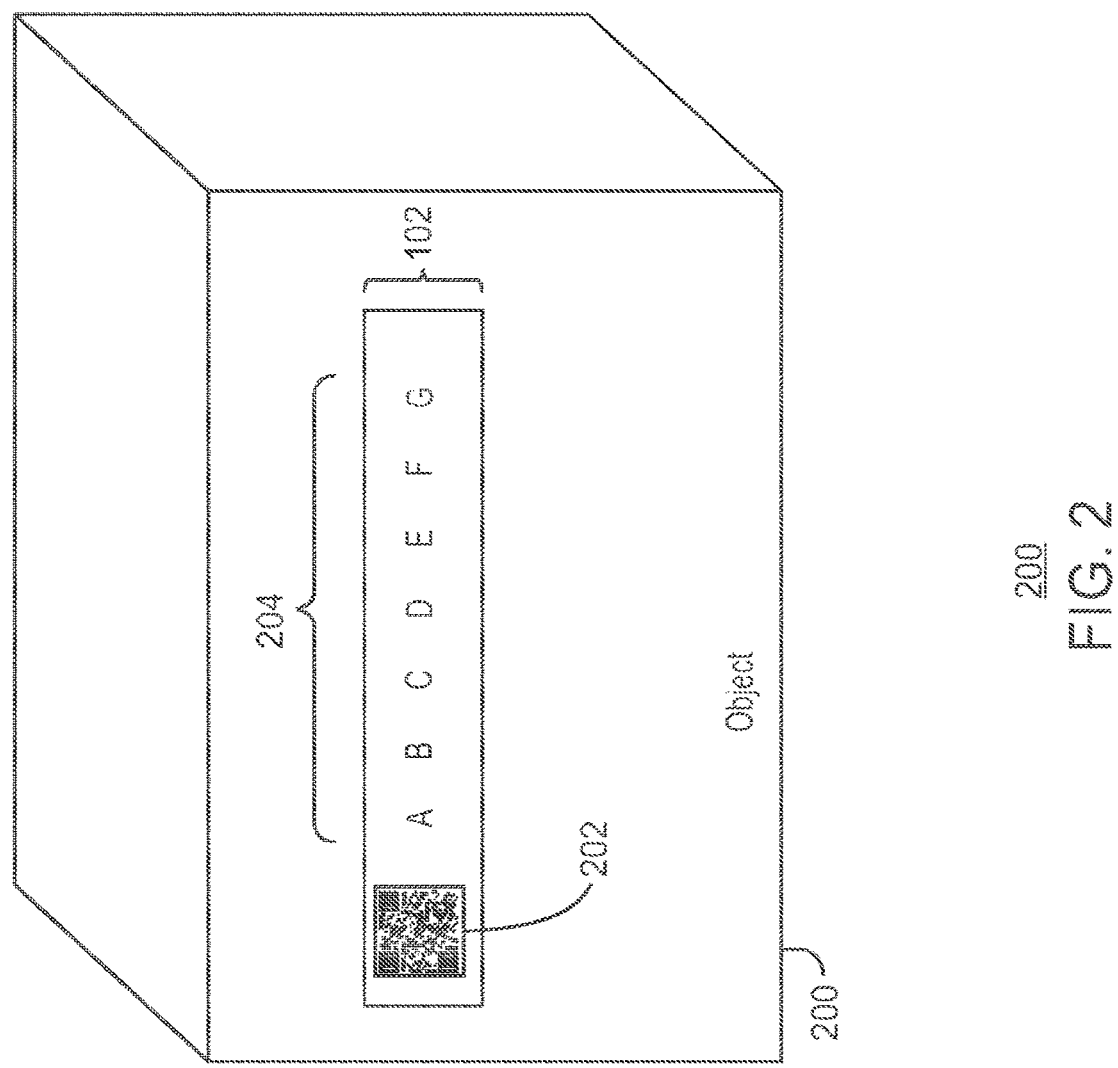
FIG. 2 is a detailed diagram of the object ID of FIG. 1 disposed on an object, according to some examples.

FIG. 2 is a diagram of an object 200 featuring the object ID 102 of FIG. 1, according to examples. The object 200 may be virtually anything upon which an object ID may be affixed or imprinted, such as a 2D- or 3D-rendered object or packaging for such objects. The object 200 may also be a computing device, such as a mobile phone, an IoT object, such as an actuator or sensor, and so on.

The object ID 102 or VDC is any image, symbol, or other component that includes or references encoded information. The object ID 102 may be printed or otherwise manufactured, such as a guilloche or other graphical alphanumeric, a 2D matrix, barcode, QR code, or any visual mark that is suitable for printing. In an example, the object ID may be imprinted, such as when formed by a stamp, laser etching, or other mechanical process.

The object ID 102 disposed upon the object 200 features a standards-based or standards-compliant mark 202 as well as a printed serialization 204, denoted as separate digits, A, B, C, D, E, F, and G (serialization elements). The standards-based mark 202 may, for example, be a QR code, as shown, a bar code, or any other machine-generated mark that has been promulgated by a standards body. The printed serialization 204 may be an IMEI, a MAC address, or other unique sequence of numbers, letters, or symbols, intended to distinguish the computing device from other computing devices connected to the Internet. The object 200 may be associated with no users, a single user, or multiple users.

The object 200 may be one of many Internet-capable devices, such as mobile phones, pads, laptop and desktop computers, and other user-accessible devices, and may thus feature object IDs similar to the object ID 102 illustrated in FIG. 2. The object 200 may also be one of other Internet-connected devices, such as servers, gateways and routers, and may also have unique object IDs. The object 200 may also be an Internet-of-things (IoT) device, such as a sensor or actuator, which may have no user interaction, and may thus also include object IDs that are unique to the respective part.

Figure 3:
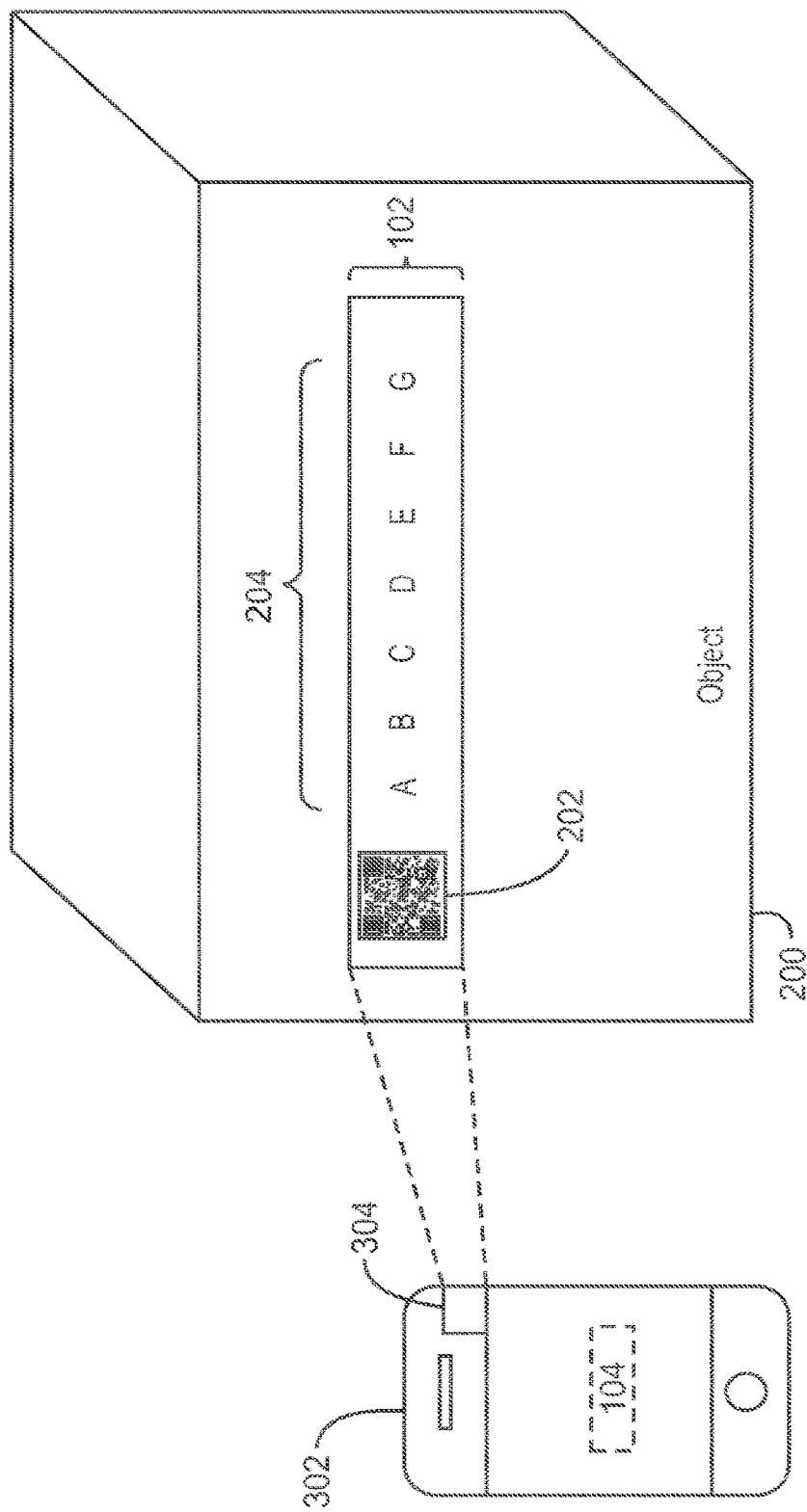
FIG. 3 is a diagram of an environment in which the object ID-centered workflow method of FIG. 1 may be implemented, according to some examples.

FIG. 3 is a diagram of an environment 300 in which the object ID-centered workflow method 100 may be implemented, according to examples. The object 200 of FIG. 2, including object ID 102 with both the standards-based mark 202 and printed serialization 204, are shown, along with a computing device 302 having imaging capability 304. As illustrated in FIG. 1, VDCs and other object IDs 102 may be used to trigger workflows on the computing device 302.

In the environment 300, a user employs the computing device 102 having imaging capability 304, such as a scanner or camera. Using the imaging capability 304, the user acquires the object ID 102 from the object 200. The computing device 102 may, for example, capture a digital image of the object ID 102 from the object 200. As used herein, a digital image may be captured by an imaging system that captures multiple images especially for depth recovery, e.g., structured light, stereo, focus variation, and so on.

While FIG. 3 depicts a mobile phone as the computing device 302, the computing device may alternatively be a notebook or laptop computer, a notebook or tablet, a gaming system, or other computing device that has the capability of capturing the object ID 102 and processing data encoded therein.

The computing device 302 further includes the forensic identification 104 first introduced in FIG. 1. The forensic identification 104 is an authentication of the object upon which the object ID is imprinted. The forensic identification 104 is indicated as a dashed box, indicating its location internal to the computing device 302. Forensic identification 104 includes capturing an image of the serialization element of the object ID, accessing a registry of stored forensic information about the object ID, and analyzing the image data with the stored data. Forensic identification 104 is discussed in more detail in FIGS. 5, 6, and 7, below.

As disclosed in detail herein, the individual elements making up the object ID 102 may be coupled to workflows available from the computing device 302. The object ID 102 is assumed to have been forensically registered at the time of manufacture of the computing device 302.

Figure 4:
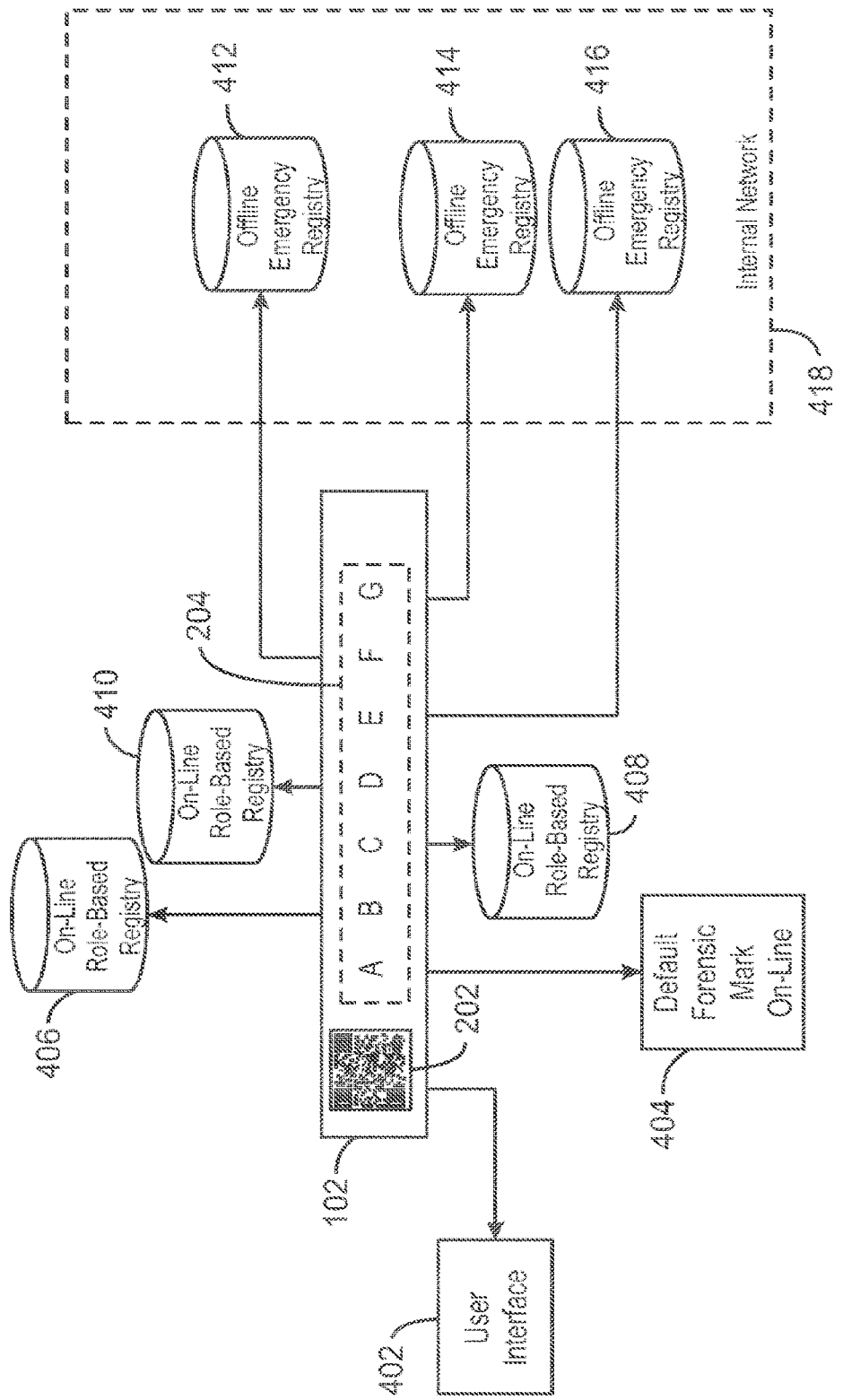
FIG. 4 is an illustration of workflows that may be associated with the serialization elements of the object ID of FIG. 1, according to some examples.

FIG. 4 is an illustration 400 of workflows that may be associated with the serialization elements of the object ID 102 of the object 200 (FIGS. 2 and 3), according to some examples. The object ID 102, with its standards-based mark 202 and printed serialization 204, the latter including serialization elements A, B, C, D, E, F, and G, are shown as before. The object ID 102 may forensically identified by an Internet-capable computing device, such as the computing device 302 (FIG. 3).

In this example, the standards-based mark 202 is associated with a user interface 402 of the computing device 302. For example, other registries and workflows depicted in FIG. 4 may be accessible to the one or more users of the computing device 302 via the user interface 402 once the standards-based mark 202 is authenticated. 3GVision's i-nigma reader, is one example of an application that reads QR codes. Once the standards-based mark 202 of the object 200 is authenticated, the user interface (UI) on the computing device 302 may list the registries (and thus workflows) available to that device.

Next, the serialization element of the printed serialization 204, denoted A, is associated with a default forensic mark on-line 404 workflow. In an example, the forensics of the individual mark, character, or glyph, are validated on-line. Thus, in FIG. 4, the "A" character is forensically identified as being unique to the object 200. Other workflows are not available to the compute device 302 until the forensic identification of the "A" character succeeds.

Serialization elements of the print serialization, denoted B, C, and D, are associated with on-line role-based registries 406, 408, and 410, respectively, while serialization elements, E, F, and G, are associated with offline emergency registries 412, 414, and 416, respectively. The on-line role-based registries 406, 408, and 410 may have some public access while the offline emergency registries 412, 414, and 416 are part of an internal network 418, such as a business enterprise, available to a more limited set of computing devices. A supply chain of objects, such as the object 200, may each be separately associated with a customer registry, a retailer registry, a manufacturing registry, an inspector registry, and a warehouse registry, as an example. On-line role-based registries 408 and 410 may actually be a single registry with multiple access points. The object ID 102 of the object 200 thus enables access, by the computing device 302 or user(s) of the computing device, to a multiplicity of parallel (or overlapping) registries, one or more of which may be associated with a single role.

As used herein, the term "workflow" refers to a defined series of computer-based tasks to produce a final outcome. Each stage in a series that makes up the workflow generally has inputs and produces outputs (including simply "states") that transforms data. Accordingly, a role-based workflow refers to a workflow with a plurality of sequences whose number and order can be specified beforehand and associated with a given role for a given user, user type, or agent.

The object ID-centered workflow method 100 thus enables the use of a standards-based mark and/or a printed serialization associated with an object to be forensically identified by a computing device, enabling subsequent connection by the computing device to on-line and/or off-line registries, for a set of role-based registry workflows. Optionally, the standards-compliant mark may be used to connect to a service or user interface, which may be part of or accessible to the computing device, which thereafter manages the other salient registry connections. The object ID-centered workflow method 100 may also allow access by the computing device to both on-line and off-line services, databases, registries, and so on, based on a single object ID of an object.

The object ID-centered workflow method 100 also enables a means of using forensic imaging on multiple printed or manufactured marks, using a high-resolution imaging device, such as a high-resolution mobile microscope, where the imaging may separately or simultaneously image the marks. The individual elements (text, digits, alphanumerics, other glyphs, etc.) of the object ID of the object may be forensically registered by using a high-resolution forensic imaging solution. The marks making up the object ID (such as those illustrated in FIGS. 2, 3, and 4) are registered and the forensic descriptors are stored in possibly multiple registries during manufacture (as part of inspection processes, for example). The later image processing and forensic identification that triggers the workflows can be compared to a registered forensic descriptor, as described below.

While the object ID is designed to be unique to the object upon which it is etched or printed, it is possible to imagine two objects being manufactured/assembled in two different places having identical printed serializations, although such would not be the case for IMEIs or MAC addresses. More likely, bad actors may attempt to replicate the object ID on a counterfeit object.

Forensic registration of the object ID during the manufacture of the object, followed by forensic identification in the field (e.g., the forensic identification 104 of FIG. 1), however, may thwart such nefarious attempts. This is possible because a character printed on a substrate (or a sheet of paper) by a printer will have a different forensic signature than the same character printed on a second substrate (or second sheet of paper). Thus, when the object ID is imaged during manufacture of the object, its forensic signature will be unique to the object, even if the same object ID is printed on a second object by the same printer at the manufacturing/assembling facility. The object ID-centered workflow method 100 exploits this fact to ensure that access to workflows by the computing device is secure.

Figure 5:
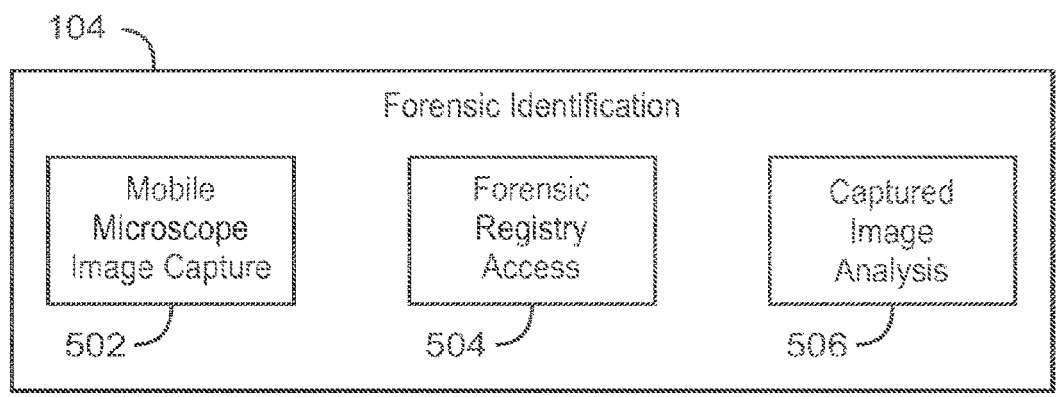
FIG. 5 is a simplified block diagram illustrating the operations performed by the forensic identification of the object ID-centered workflow method of FIG. 1, according to some examples.

FIG. 5 is a simplified block diagram illustrating the operations performed by the forensic identification 104 of the object ID-centered workflow method 100 of FIG. 1, according to examples. Recall from FIG. 1 that the forensic identification 104 may take place within a computing device, following imaging of the object ID of an object by the computing device. In another example, the forensic identification 104 taking place in the computing device, may be based on object ID imaging of another device, such as a high-resolution imaging camera. Based on forensic analysis of the object ID, the computing device may be provided access to one or more registries of workflows. As such, the forensic identification 104 takes place in the field, such as when the object is sold to a consumer. In other words, the forensic identification 104 does not take place during manufacture of the object, but after completion of its manufacture.

The forensic identification 104 includes mobile microscope image capture 502, forensic registry access 504, and captured image analysis 506. The first operation, mobile microscope image capture 502, may be performed by a high-resolution microscope to capture an image of the object ID of the object. The second operation, forensic registry access 404, consults a forensic registry in which registered forensic descriptors of each object ID imaged at a manufacturing facility are stored. In some examples, the forensic registry access 504 involves remote access of the forensic registry, such as via a wireless connection to the Internet. The object ID that was forensically registered at the factory may serve as an index into the forensic registry, as one example, such that the relevant registered forensic descriptor may be retrieved. Captured image analysis 406 involves comparing the registered forensic descriptor from the forensic registry with the captured image of the object ID.

The registered forensic descriptor of the original object ID may be generated in different ways. In one example, a series of images of the object ID are obtained and a forensic signature of the object ID is made using the images. Techniques such as using a shape warp code or performing photometric stereoscopy may be used to generate the registered forensic descriptor of the object ID. Thus, the registered forensic descriptor is a transformation of the image of the object ID that may be saved, such as in the forensic registry, for later comparison. Designers of ordinary skill in the art recognize a number of different ways in which registered forensic descriptors may be generated from an object ID.

Figure 6:
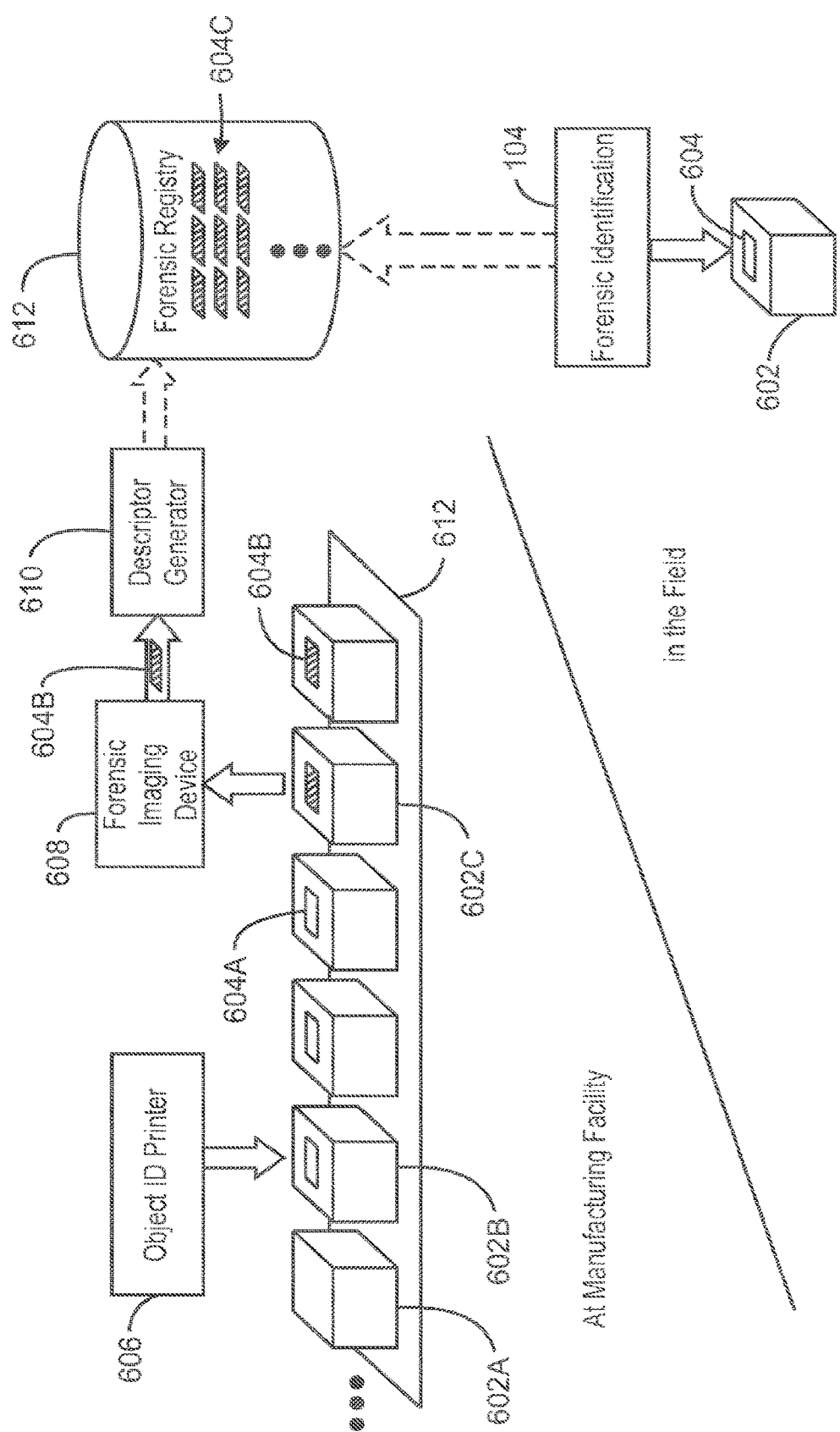
FIG. 6 pictorially illustrates manufacturing operations performed to enable forensic identification of a computing device by the object ID-centered workflow method of FIG. 1, according to some examples.

FIG. 6 pictorially illustrates possible operations 600 performed to enable forensic identification 104 of an object ID of an object, according to examples. Before forensic identification 104 can take place, several operations 600 are depicted as taking place at a manufacturing facility. An assembly line 612 depicts multiple objects 602 being manufactured. A first object 602A includes no object ID. A second object 602B includes an object ID 604A that is printed onto the device by an object ID printer 606 located at the manufacturing facility. The object ID 604A is depicted as a rectangle disposed atop the object 602B.

A forensic imaging device 608 located farther down the assembly line 612 from the object ID printer 606 images the object IDs 604A to generate a registered forensic descriptor 604C of the object ID. Once image capture has taken place, the object IDs are shown with vertical stripes as imaged object IDs 604B and the object upon which the object ID has been captured is depicted as object 602C (collectively, "objects 602"). The imaged object IDs 604B are sent to a descriptor generator 610, where they are converted to registered forensic descriptors 604C of the object IDs. The object IDs 604 thus have three states: original object IDs 604A, imaged object IDs 604B, and registered forensic descriptors of the object IDs 604C. The registered forensic descriptors 604C are stored in a forensic registry 612.

The descriptor generator 610 may send the captured images to the forensic registry 612, or the transmission of the registered forensic descriptors 604C to the registry may be performed by an additional control mechanism having processing, networking, and other capability that may not be part of the forensic imaging device 608 or descriptor generator 610. The forensic registry 612 may be located at the manufacturing facility. In some examples, the forensic registry 612 is remote to the manufacturing facility, and is thus accessed via a wired or wireless network, as indicated by the dashed arrow.

A diagonal line demarks the separation of what takes place at the manufacturing facility versus what occurs in the field. At the right of the diagonal line, the object 602, having an object ID 604, is shown in the field. This is where the forensic identification operations 500 (FIG. 5) take place; namely, mobile microscope image capture 502, forensic registry access 504, and captured image analysis 506. Recall from FIG. 3 that the forensic identification 104 may be done by a computing device, such as a mobile phone. The downward arrow from the forensic identification 104 is meant to illustrate the image capture 502 operation while the upward arrow illustrates the forensic registry access 504 operation. As with the operations at the manufacturing facility, the forensic registry access 504 is likely to access the forensic registry 612 remotely; thus, the upward arrow is dashed.

The captured image analysis 506, which is not explicitly illustrated in FIG. 6, may take place within the computing device, such as the mobile phone 302 (FIG. 3). The mobile microscope image capture 502 which may be performed by the mobile phone or by a standalone device, may, in the latter case, transmit the captured image to the computing device, such as by using a Bluetooth low energy (BLE) transmission. The captured image analysis 506 also includes transforming the image captured into a registered forensic descriptor. The forensic registry access 504 may also take place in the computing device. In some examples, the computing device may include a mobile imaging device of capability sufficient to perform mobile microscope image capture 402. In other examples, the field capture of the object ID on the object 602 is performed by a separate, specialized device.

Where a match between the field-captured image and the factory-captured image of the element of the object ID is made, access to a specific workflow from the registry of workflows 106 (FIG. 1) is possible. As an alternative, a signature extracted from the image, which is smaller than the image, is compared. In this manner, the object ID-centered workflow method 100 makes the object's manufactured ID (and not the mobile device authentication and applications) the primary instrument for launching and selecting the workflow.

This access may be a multi-tiered access in which other criteria are satisfied before full access to the registries of workflow is possible. Thus, the object ID-based analysis may be a first step in enabling access. Other criteria, such as biometrics, may enable a first user access to workflows that a second user may not have.

Other features of the object ID-centered workflow method 100 include allowing the object ID-triggered workflows to benefit from the IMEI, MAC, GPS, biometrics, and other features of the mobile device to provide knowledge, possession and identity required for role-based access, secure, workflows.

The object ID-centered workflow method 100 also provides a means of tying object serialization directly to multiple forensic marks. Thus, the individual marks making up the serialized object ID may each be registered for the physical forensics of the object.

The object ID-centered workflow method 100 also provides a means of tying role-based forensic authentication to a series of printed/manufactured marks. Each mark of the object ID may have a different role in downstream workflow combination. As an example, if there are three roles (public, private, and restricted) and three workflows, nine marks will suffice to generate workflows that satisfy all combinations of roles and workflows.

Further, as used herein, the term "variable data component" refers to a component that can be interrogated (i.e., scanned, decoded, etc.) by a computing device and that stores encoded information. The variable data component may be printed, such as a barcode. The variable data component may be physical as in the example of a printed or affixed variable data component, or it may be virtual, as in an image on a computer screen. Any security-requiring workflow may be supported, or any workflow tied to an object with the object ID-centered workflow method.

The object ID-centered workflow method described above may be implemented without changes to mobile applications or capabilities and may be beneficial when new authentication, identification, security and workflows applications and services are available on mobile devices. The object ID-centered workflow method may also empower two- and three-dimensional printing as primary triggers for workflows of value. Thus, workflows of value for an object may include asserting a trademark, customs, price discounting, and so on, as examples.

Figure 7:
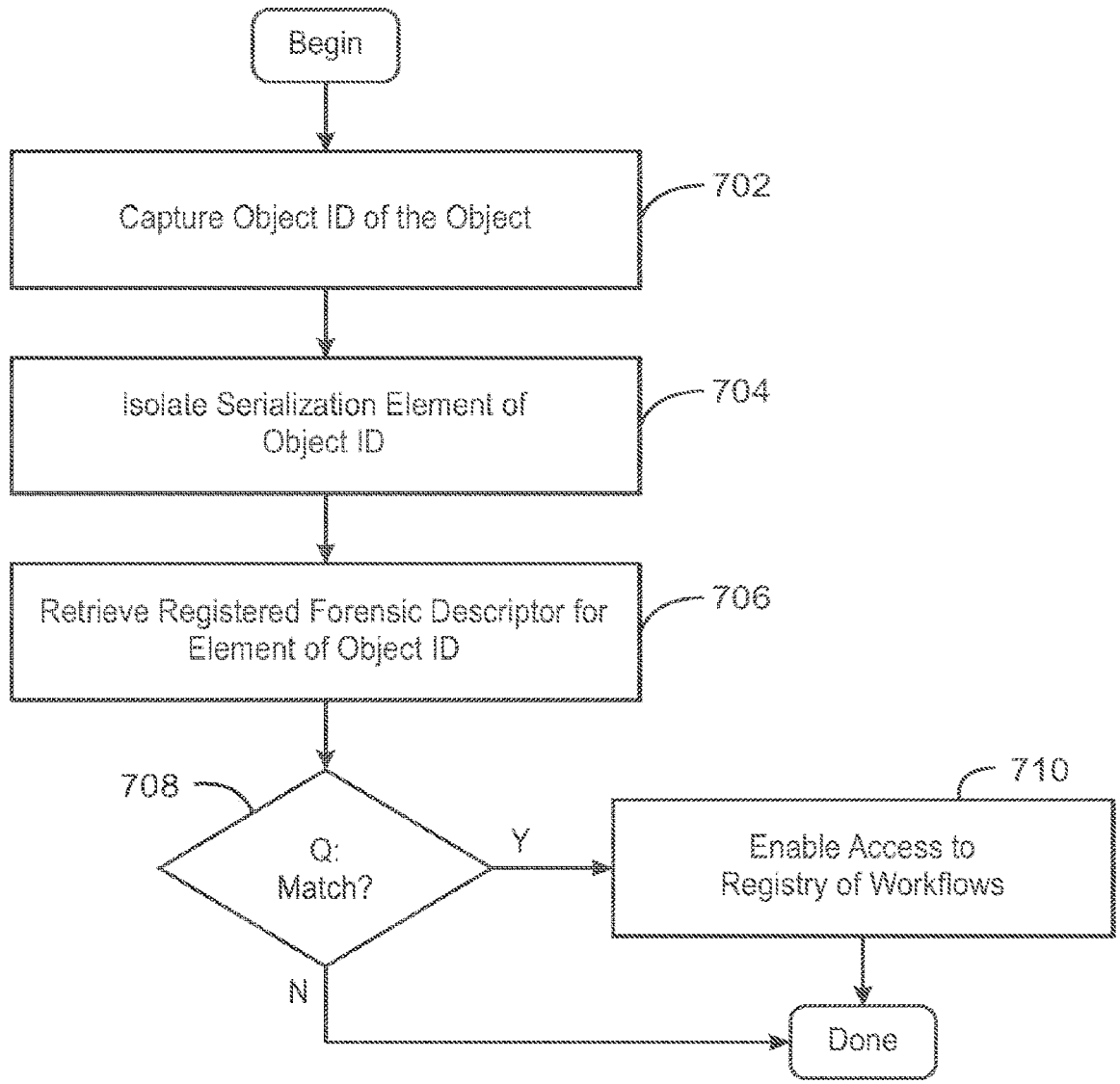
FIG. 7 is a flow diagram showing operations performed by a computing device to implement the object ID-centered workflow method of FIG. 1, according to some examples.

FIG. 7 is a flow diagram showing operations performed by a computing device, such as a mobile phone, used to implement the object ID-centered workflow method 100, in some examples. The computing device encounters an object having an object ID, and the object ID is captured by the computing device, as described above (block 702).

The object ID may be made up of both a standards-compliant mark, such as the mark 202, as well as a printed serialization such as the serialization 204 (FIG. 2). As an example, assume the operations of FIG. 7 are concerned with the "C" in the serialization 204 (FIG. 2). The computing device thus isolates the element, "C", of the serialization (block 704) and retrieves the registered forensic descriptor for the "C" element (block 706), such as from a forensic registry. The computing device also converts the "C" image into a forensic descriptor to compare to the registered forensic signature retrieved from the registry. If there is a match (block 708), the computing device may enable access to a registry of workflows that are associated with the "C" element (block 710). Otherwise, no access to the registry is available. The process may be repeated for other serialization elements of the object.

Figure 8:
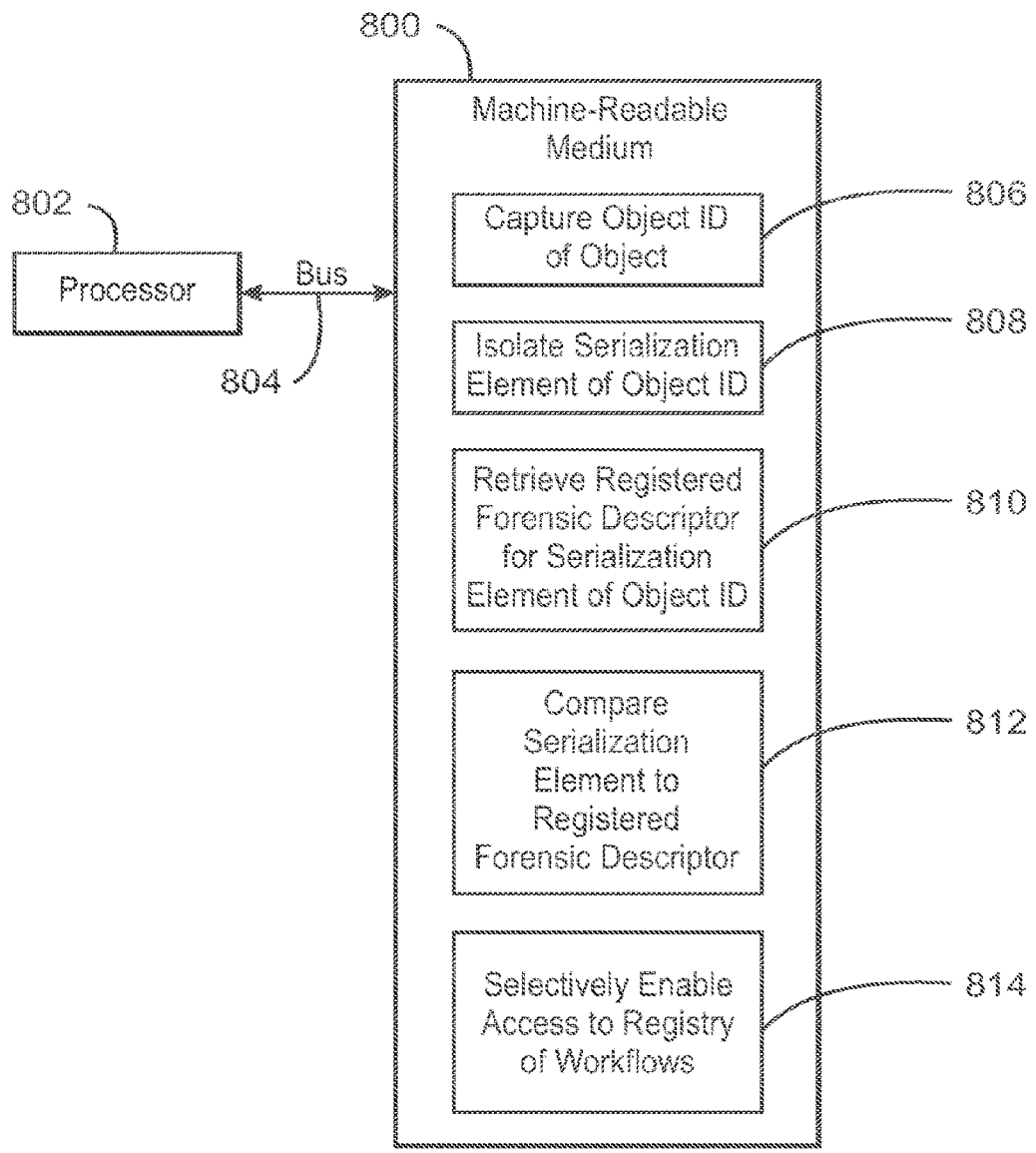
FIG. 8 is a block diagram of an exemplary non-transitory, machine readable medium including instructions to direct a processor to perform the object ID-centered workflow method of FIG. 1, according to examples.

FIG. 8 is a block diagram of an exemplary non-transitory, machine readable medium 800 including code or instructions to direct a processor 802 to perform the object ID-centered workflow method 100 of FIG. 1, according to examples. The processor 802 may access the non-transitory, machine readable medium 800 over a bus 804. The non-transitory, machine readable medium 800 may include devices for storage or may include optical disks, thumb drives, or any number of other hardware devices.

The non-transitory, machine-readable medium 800 may include code to direct the processor 802 to capture the object ID of an object 806, isolate a serialization element of the object ID 808, convert the serialized element to a forensic descriptor, retrieve a registered forensic descriptor associated with the serialization element of the object ID, such as from a forensic registry 810, compare the forensic descriptor to the registered forensic descriptor found in the registry 812, and selectively enable access to a registry or registries of workflows 814 based on the comparison.

While the present techniques may be susceptible to various modifications and alternative forms, the techniques discussed above have been shown by way of example. It is to be understood that the technique is not intended to be limited to the particular examples disclosed herein. Indeed, the present techniques include all alternatives, modifications, and equivalents falling within the scope of the following claims.

What is claimed is:

1. A method comprising:
imaging, via an imaging device, a first serialization element of an object identifier of an object;
retrieving, from a forensic registry, a registered forensic descriptor of the first serialization element generated using a shape warp code of an image of the first serialization element forensically registered at time of manufacture; and
enabling access to a first registry of workflows in response to matching the imaged first serialization element with the registered forensic descriptor by applying the shape warp code to the imaged first serialization element.

2. The method of claim 1, further comprising:
imaging, via the imaging device, a second serialization element of the object identifier of the object;
retrieving, from the forensic registry, a registered forensic descriptor of the second serialization element; and
enabling access to a second registry of workflows in response to the registered forensic descriptor of the second serialization element matching the imaged second serialization element.

3. The method of claim 2, wherein access to the second registry of workflows comprises a second access to the first registry of workflows.

4. The method of claim 2, wherein the second registry of workflows is different than the first registry of workflows.

5. The method of claim 1, wherein access to the first registry of workflows is available to a mobile device.

6. The method of claim 1, wherein access to the first registry of workflows comprises access to a role-based workflow from the first registry of workflows.

7. The method of claim 1, wherein the object is a computing device and the object identifier comprises one of:
a media access control address of the computing device, and
an international mobile equipment identity of the computing device.

8. A computing device comprising:
a processor;
a non-transitory computer readable medium with instructions stored thereon that, when executed by the processor, cause the computing device to:
image, via an imaging device, a first serialization element of an object identifier of an object;
retrieve, from a forensic registry, a registered forensic descriptor of the first serialization element generated using a shape warp code of an image of the first serialization element forensically registered at time of manufacture; and
enable access to a first registry of workflows in response to matching the imaged first serialization element with the registered forensic descriptor by applying the shape warp code to the imaged first serialization element.

9. The computing device of claim 8, wherein the instructions when executed by the processor further cause the computing device to:
- image, via the imaging device, a second serialization element of the object identifier of the object;
- retrieve, from the forensic registry, a registered forensic descriptor of the second serialization element; and
- enable access to a second registry of workflows in response to the registered forensic descriptor of the second serialization element matching the imaged second serialization element.

10. The computing device of claim 9, wherein access to the second registry of workflows comprises a second access to the first registry of workflows.

11. The computing device of claim 9, wherein the second registry of workflows is different than the first registry of workflows.

12. The computing device of claim 8, wherein access to the first registry of workflows is available to a mobile device.

13. The computing device of claim 8, wherein access to the first registry of workflows comprises access to a role-based workflow from the first registry of workflows.

14. A non-transitory computer readable medium storing instructions that when executed by a processor of a computing device cause the computing device to:
- image, via an imaging device, a first serialization element of an object identifier of an object;
  - retrieve, from a forensic registry, a registered forensic descriptor of the first serialization element generated using a shape warp code of an image of the first serialization element forensically registered at time of manufacture; and
  - enable access to a first registry of workflows in response to matching the imaged first serialization element with the registered forensic descriptor by applying the shape warp code to the imaged first serialization element.

15. The non-transitory computer-readable medium of claim 14, wherein the instructions when executed by the processor further cause the computing device to:
- image, via the imaging device, a second serialization element of the object identifier of the object;
- retrieve, from the forensic registry, a registered forensic descriptor of the second serialization element; and
- enable access to a second registry of workflows in response to the registered forensic descriptor of the second serialization element matching the imaged second serialization element.

16. The non-transitory computer-readable medium of claim 15, wherein access to the second registry of workflows comprises a second access to the first registry of workflows.

17. The non-transitory computer-readable medium of claim 15, wherein the second registry of workflows is different than the first registry of workflows.

18. The non-transitory computer-readable medium of claim 14, wherein access to the first registry of workflows is available to a mobile device.

19. The non-transitory computer-readable medium of claim 14, wherein access to the first registry of workflows comprises access to a role-based workflow from the first registry of workflows.

* * * * *